March 13, 1951        E. HOFFMAN        2,544,960
GARDEN SEEDER WITH DISPENSER HAVING VIBRATORY
MEANS AND VARIABLE SEED DISCHARGE MEANS
Filed Feb. 6, 1946        2 Sheets-Sheet 1
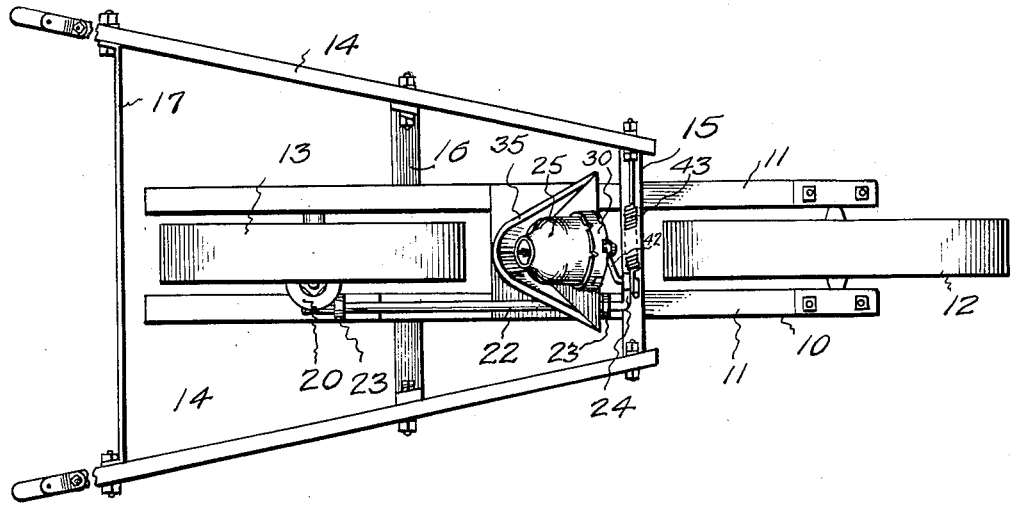
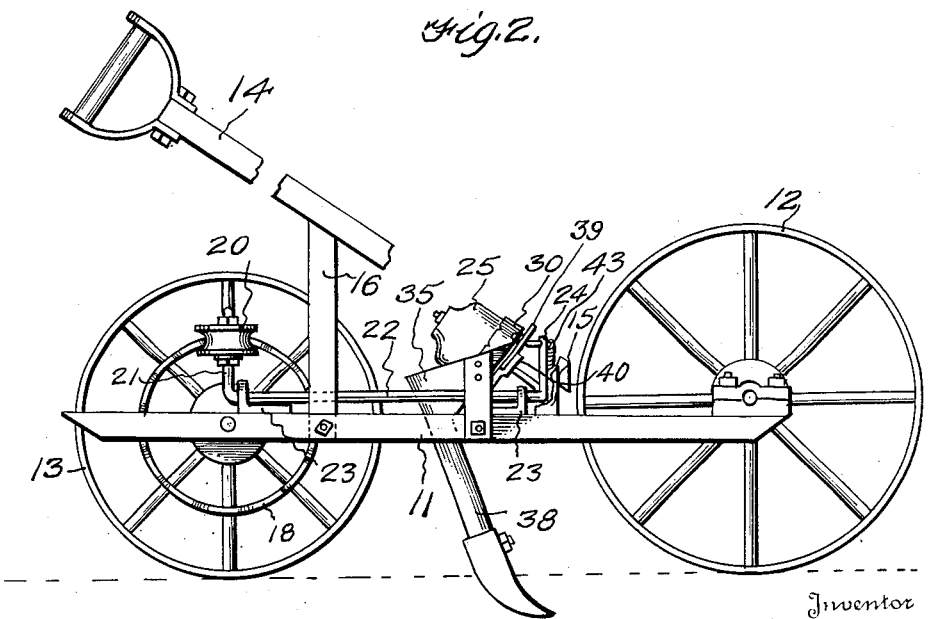
Inventor
EUGENE HOFFMAN
Attorney

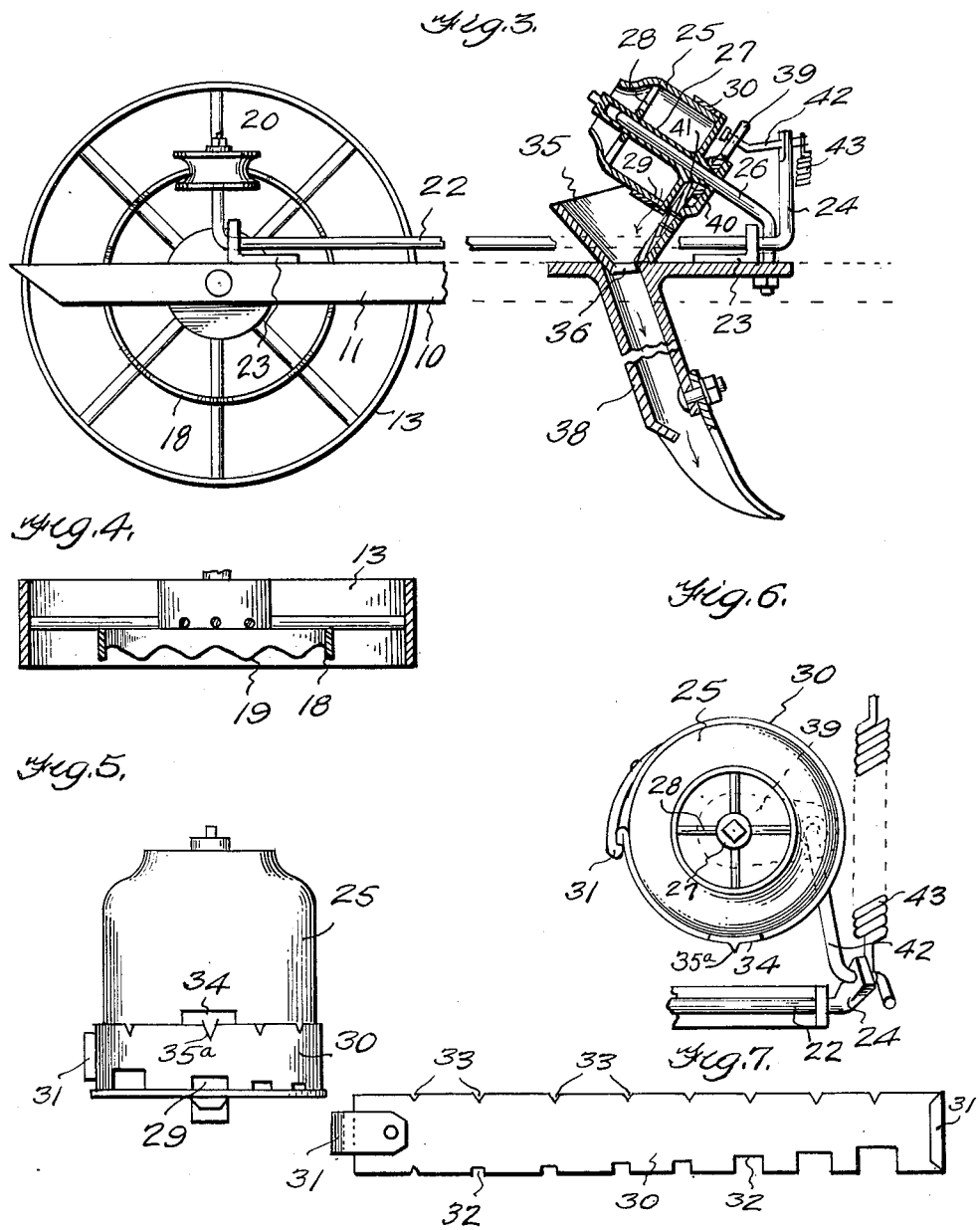

Patented Mar. 13, 1951

2,544,960

UNITED STATES PATENT OFFICE 2,544,960

GARDEN SEEDER WITH DISPENSER HAVING VIBRATORY MEANS AND VARIABLE SEED DISCHARGE MEANS

Eugene Hoffman, Eatonia, Saskatchewan, Canada

Application February 6, 1946, Serial No. 645,731
In Canada March 28, 1945

1 Claim. (Cl. 222—161)

This invention relates to a garden seeder with dispenser having vibratory means and variable seed discharge means, and has for one of its objects the production of a simple and efficient seeder or drill having an adjustable dispenser for planting all kinds of garden seed in an even manner according to the size of the seeds.

A further object of this invention is the production of a simple and efficient means for agitating or vibrating the seed dispenser so that the seed will flow freely and easily therefrom and may be adjusted to dispense seed of various types.

Other objects and advantages of this invention will appear throughout the following specification and claim.

In the drawings:

Figure 1 is a top plan view of the seeder or drill;

Figure 2 is a side elevational view thereof, certain parts being broken away;

Figure 3 is a fragmentary longitudinal sectional view of the seeder or drill certain parts being shown in side elevation;

Figure 4 is a transverse sectional view of agitating wheel;

Figure 5 is a side elevational view of the seed dispenser;

Figure 6 is a top plan view of the seed dispenser;

Figure 7 is a plan view of the encircling band which regulates the discharge of seed from the dispenser according to size.

By referring to the drawings, it will be seen that 10 designates the frame of the device which consists of a pair of parallel rails 11. The frame 10 is supported by a front wheel 12 and a rear or agitating wheel 13. These wheels 12 and 13 are journaled between the parallel rails 11, as shown in Figure 1. Suitable guiding handles 14 extend rearwardly and upwardly of the frame 10 and are braced by the braces 15, 16 and 17.

The rear or agitating wheel 13 is provided with an agitating band 18 having a scalloped rim 19 which rim 19 is engaged by the periphery of a channeled wheel 20 in the nature of a pinion. This wheel or pinion 20 is carried by the upper end of the upwardly extending portion 21 of the longitudinally extending agitating shaft 22. The shaft 22 is journaled on the bearing plates 23 which are mounted on the upper face of one of the rails 11 of the frame 10. The agitating shaft 22 is also provided with a forward upwardly extending end 24.

A dispenser 25 is carried by the frame 10 near the forward end thereof and is journaled upon an upwardly and rearwardly inclined supporting spindle 26 to support the dispenser 25 with its upper end in a rearwardly inclined position, as shown in Figure 2. The dispenser 25 is provided with a central elongated journal 27 into which the spindle 26 fits. The journal 27 is braced by suitable lateral braces 28. The dispenser 25 is also provided near its bottom at one side with a dispensing aperture or port 29. A selecting band 30 fits around the base of the dispenser 25 and is clamped in position by the overlapping hooked ends 31. The band 30 is provided with a plurality of seed-dispensing notches 32 along the lower edge thereof, of progressively diminishing sizes extending from end to end, as shown in Figure 7. A plurality of V-shaped notches 33 are formed along the upper edge of the band 30 opposite the notches 32. A lug 34 is carried by one side of the dispenser 25 directly over the dispensing aperture or port 29. The lug 34 is provided with a tapering tooth 35a which is adapted to fit in one of the selected V-shaped notches 33 of the band 30 and hold the band 30 in a selected position to regulate the size of the seed discharge opening in the dispenser 25. By rotating the band 30 around the base of the dispenser 25, the notch 32 of the desired size, may be brought into registration with the aperture or port 29. The dispenser 25 is slidable upwardly upon the spindle 26 to permit the tapering tooth 35a to ride over the notches 33. The flow of selected size seeds may in this manner be regulated by adjusting the band 30 upon the dispenser 25.

A tapering collecting trough 35 is located below the discharge port 29 of the dispenser 25 and is provided with a discharge opening 36 which empties into the ground shoe 38 of the conventional type. The collecting trough 35 is provided with an open upper end which is inclined upwardly and rearwardly of the frame 10 in a proper direction so that an operator gripping the handles 14 in the rear of the trough 35 may observe the seed or grain flowing through the trough and thereby ascertain whether or not the seed or grain is being delivered to the ground shoe for planting. The operator may in this manner be kept advised, without minute inspection, when the supply of seed or grain has been exhausted from the dispenser 25. The bottom of the dispenser 25 carries a crank arm 39 which is mounted to oscillate upon the spindle 26 between the plates 40 and 41 and is fixed to the dispenser 25. A link 42 connects the outer end of the crank arm 39 to the upwardly extending forward end 24 of the agitating shaft 22. A tension return spring 43 is connected to the end 24 and link 42 at one end and to the frame 10 at its other end.

As the device travels in a forward direction, the scalloped edge 19 of the band 18, which constitutes a ratchet crown drive will move the wheel or pinion 20 inwardly and outwardly, thereby causing the shaft 22 to oscillate. This operation will cause the dispenser 25 to oscillate with a rocking motion. The contents of the dispenser 25 will in this way be agitated and the seed will drop out through the port 29. The dispenser 25 is set at an angle of about 45° so that an operator may easily view the contents thereof through the open upper end of the dispenser. The dispenser 25 loosely fits over the spindle 26 and may therefore be easily removed or detached for refilling or emptying.

It should be noted that as the wheel or pinion 20 rolls over the scalloped edge 19 of the band 18, the shaft 22 will be caused to properly oscillate and the tension of the spring 43 will hold the wheel 20 firmly in engagement with the scalloped edge 19 of the band 18 and cause the wheel to closely follow the undulating conformation of the band 18. The seed within the dispenser 25 will be forced to flow through the discharge port 29 by gravity, and as stated above the band 30 is properly adjusted to cause seed of the desired type or size to be discharged from the dispenser 25. The conventional shoe 38 will penetrate the ground to the desired depth so as to properly sow the seed.

It should be noted also that in view of the fact that the dispenser is adjustable and removable and is placed in such a position that the seed will flow freely therefrom, and the seed will not become broken or damaged in any way during the seeding operation. Furthermore, the dispenser is in such a position as to permit the operator to see the contents of the dispenser at all times.

Certain detail changes in the construction of the seeder or drill may be made without departing from the spirit of the invention, so long as such changes fall within the scope of the appended claim.

Having described the invention, what is claimed is:

A device of the class described comprising a frame having a forward and a rear end, a dispenser carried intermediate the ends of said frame and supported in a rearwardly and upwardly inclined position, a trough having an open upwardly and rearwardly inclined upper end for receiving the contents of the trough from a point near the rear end of the frame as the contents pass through the trough from the dispenser, said dispenser having a base provided with a discharge port, the discharge port of the dispenser being located within the open inclined upper end of said trough, an upwardly and rearwardly inclined spindle carried by the frame, said dispenser being rotatably mounted upon said spindle, means for agitating said dispenser upon the spindle to facilitate the dispensing of the contents thereof from said dispenser, a rotatably adjustable band locked in a selected position upon and encircling the base of the dispenser, and said band having various sized openings formed therein adapted to be brought into selective registration with said port to regulate the discharge of the contents of said dispenser from said port.

EUGENE HOFFMAN.

REFERENCES CITED

The following references are of record in the file of this patent:

UNITED STATES PATENTS

| Number | Name | Date |
| --- | --- | --- |
| 197,092 | Burris | Nov. 13, 1877 |
| 211,106 | Norton | Jan. 7, 1879 |
| 335,959 | Ratliff | Feb. 9, 1886 |
| 397,214 | Ballard | Feb. 5, 1889 |
| 404,056 | Schofield | May 28, 1889 |
| 453,610 | Branan | June 9, 1891 |
| 601,897 | Michon | Apr. 5, 1898 |
| 618,136 | Schofield | Jan. 24, 1899 |
| 1,000,003 | Horton | Aug. 8, 1911 |
| 1,474,599 | Martin | Nov. 20, 1923 |